(12) United States Patent
Koeninger

(10) Patent No.: US 10,268,632 B2
(45) Date of Patent: *Apr. 23, 2019

(54) REAL TIME AND SCALABLE SPACE-TIME DATA RECOVERY FROM EXISTING BACKUP SYSTEMS

(71) Applicant: International Business Machines Corporation, Armonk, NY (US)

(72) Inventor: R Kent Koeninger, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 314 days.

This patent is subject to a terminal disclaimer.

(21) Appl. No.: 15/221,064

(22) Filed: Jul. 27, 2016

(65) Prior Publication Data

US 2017/0031781 A1 Feb. 2, 2017

Related U.S. Application Data

(60) Provisional application No. 62/197,597, filed on Jul. 28, 2015.

(51) Int. Cl.
*G06F 17/30* (2006.01)
*G06F 16/11* (2019.01)
*G06F 11/14* (2006.01)

(52) U.S. Cl.
CPC ........ *G06F 16/113* (2019.01); *G06F 11/1451* (2013.01); *G06F 11/1469* (2013.01); *G06F 17/30073* (2013.01); *G06F 2201/80* (2013.01); *G06F 2201/84* (2013.01)

(58) Field of Classification Search
CPC ........... G06F 17/30073; G06F 11/1451; G06F 11/1469; G06F 2201/84; G06F 2201/80
See application file for complete search history.

(56) References Cited

U.S. PATENT DOCUMENTS

| | | | | |
|---|---|---|---|---|
| 7,966,293 B1 * | 6/2011 | Owara | ................ | G06F 11/1448 707/654 |
| 9,286,166 B2 * | 3/2016 | Paterson | ............. | G06F 11/1451 |
| 9,430,331 B1 * | 8/2016 | Basov | ................ | G06F 11/1451 |

(Continued)

OTHER PUBLICATIONS

IBM Patents or Patent Applications Treated As Related Date: May 31, 2018.

*Primary Examiner* — Alexander Khong
(74) *Attorney, Agent, or Firm* — Jeffrey S LaBaw; Robert Sullivan; Feb R Cabrasawan

(57) ABSTRACT

Time based protection of data stored in a source volume of a computer system uses a directory structure to store backups from a storage system. A first backup from a storage system is received. The first backup contains an image of the source volume for a first time. A first time stamp representing the first time is associated with the first backup. The first backup is stored as a first directory indexed by the first time stamp in a top backup directory. A second backup is received from the storage system. The second backup contains an image of the source volume for a second time. A second time stamp representing the second time is associated with the second backup. The second backup is stored as a second directory indexed by the second time stamp in the top backup directory. The first and second directories are linked to a section of the top backup directory at a root of the top directory.

20 Claims, 10 Drawing Sheets

(56) References Cited

U.S. PATENT DOCUMENTS

| | | | | |
|---|---|---|---|---|
| 9,659,021 | B1 * | 5/2017 | Dobrean | G06F 11/1456 |
| 2011/0246427 | A1 * | 10/2011 | Modak | G06F 11/1469 |
| | | | | 707/653 |
| 2014/0310245 | A1 * | 10/2014 | Novick | G06F 17/30575 |
| | | | | 707/645 |
| 2015/0331755 | A1 * | 11/2015 | Morgan | G06F 17/3033 |
| | | | | 707/646 |
| 2016/0179631 | A1 * | 6/2016 | Sun | G06F 11/1471 |
| | | | | 707/648 |

* cited by examiner

REAL TIME AND SCALABLE SPACE-TIME DATA RECOVERY FROM EXISTING BACKUP SYSTEMS

REFERENCE TO PROVISIONAL APPLICATION

This application claims benefit of U.S. provisional application Ser. No. 62/197,597 which is hereby incorporated by reference.

TECHNICAL FIELD

Various embodiments of the invention relate to methods and systems for time-based data protection.

BRIEF SUMMARY

According to this disclosure, a method, apparatus and computer program product for data recovery is described. Time based protection of data stored in a source volume of a computer system uses a directory structure to store backups from a storage system. A first backup from a storage system is received. The first backup contains an image of the source volume for a first time. A first time stamp representing the first time is associated with the first backup. The first backup is stored as a first directory indexed by the first time stamp in a top backup directory. A second backup is received from the storage system. The second backup contains an image of the source volume for a second time. A second time stamp representing the second time is associated with the second backup. The second backup is stored as a second directory indexed by the second time stamp in the top backup directory. The first and second directories are linked to a section of the top backup directory at a root of the top directory.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

DETAILED DESCRIPTION

Figure 1:
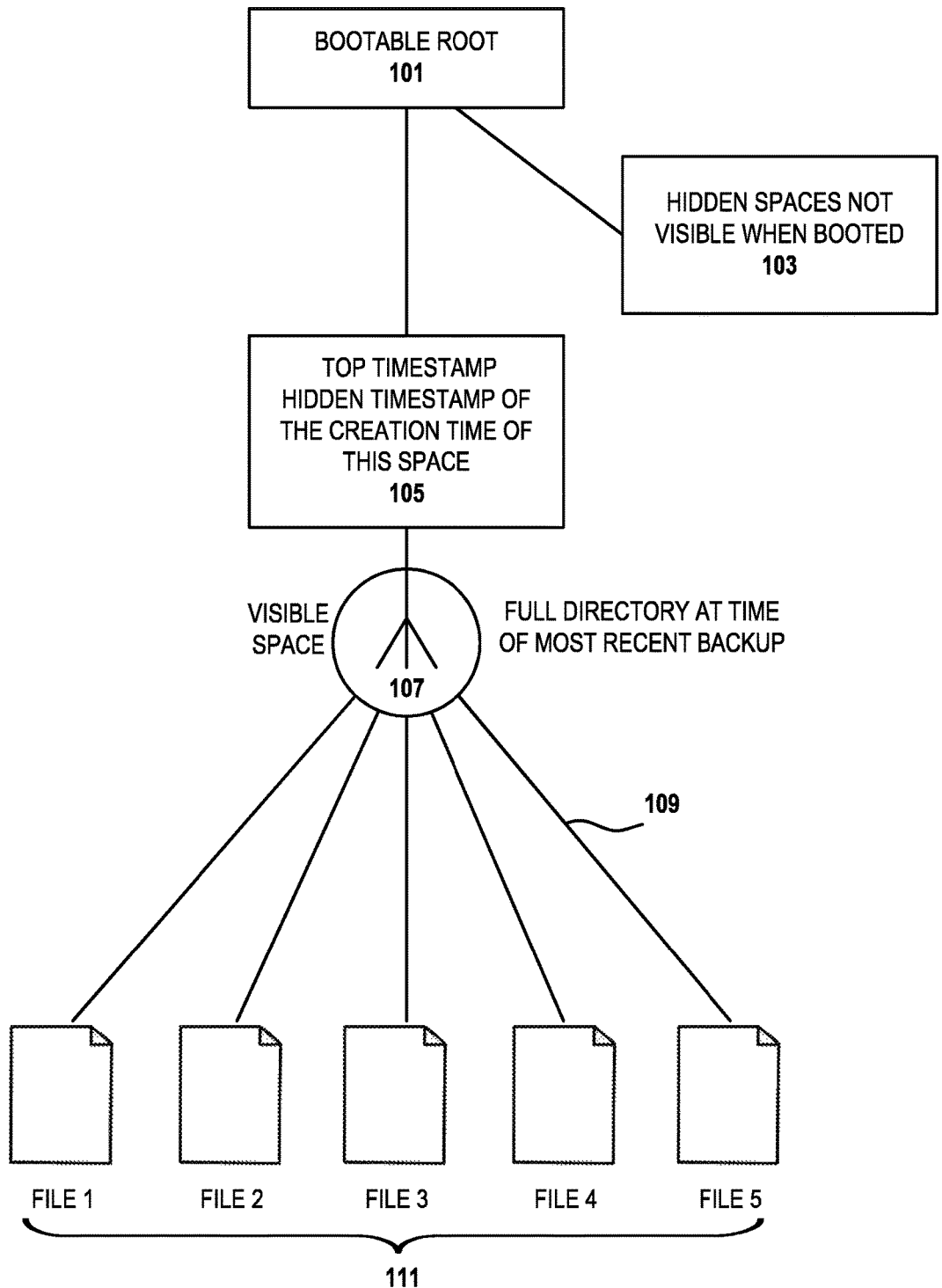
FIG. 1 shows a directory structure that illustrates, in some embodiments of the invention, the most recently created Space is not hidden and thus is bootable.

The following detailed description refers to the accompanying drawings. The same or similar reference indicators may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Various embodiments disclose methods and system for time-based data protection and resiliency as described below. In some embodiments, such systems are called Continuum, or Continuum Navigator.

The following lists some of the features in various embodiments and the mechanisms for implementing those feature.

The embodiments of the Continuum Navigator are based on the rationale that backup systems are useless by themselves; what one needs are restore systems. The implementations of the various layers and features of the example embodiments would most likely be released in a series of application releases for a series of data servers. Those skilled in the art will understand that refinements and enhancements can be made to the exemplary embodiments described in the specification.

Data backup is a well-known art. However, the interfaces to restore such data are often difficult, unintuitive and lack functionality. One of the goals of embodiments of the invention is to present the backups with intuitive and augmented interfaces such that a user can restore files without a manual or instruction with powerful tools to search for the desired data. Embodiments of the invention will work for past-time data that existing backup systems have stored.

For an example Linux embodiment, the system would present an image of the filesystem for each past-time backup (often incremental backups) as if it were a current Linux filesystem image. Thus, one could search for files using standard Linux commands or utilities with advanced graphical user interfaces that are more intuitive. These searches would work through "Space" (each instance of a backup) and through "Time" (all backups). Hence, the terminology of a space-time continuum is used in this disclosure.

The embodiments of the invention "invert" a backup index database from which files were backed up to a complete image of the file systems for each past time, i.e. a "Space" (such as a POSIX filesystem image). The embodiments index those Spaces so that they can be easily searched through "time". This inverted database can be implemented as a file system called a "Continuum."

The generality of this functionality is powerful. A user can search filenames and directories using standard Linux commands such as "ls" and "find". Given the user could use all standard Linux utilities, if the Linux system were to maintain inverted indices, those could be rapidly searchable as well. This arrangement would enable searching by content though all "Spaces" at all "Times". For example, one could find all instances of files that contain the phrase "George Washington", no matter when they were created or modified.

Figure 10:
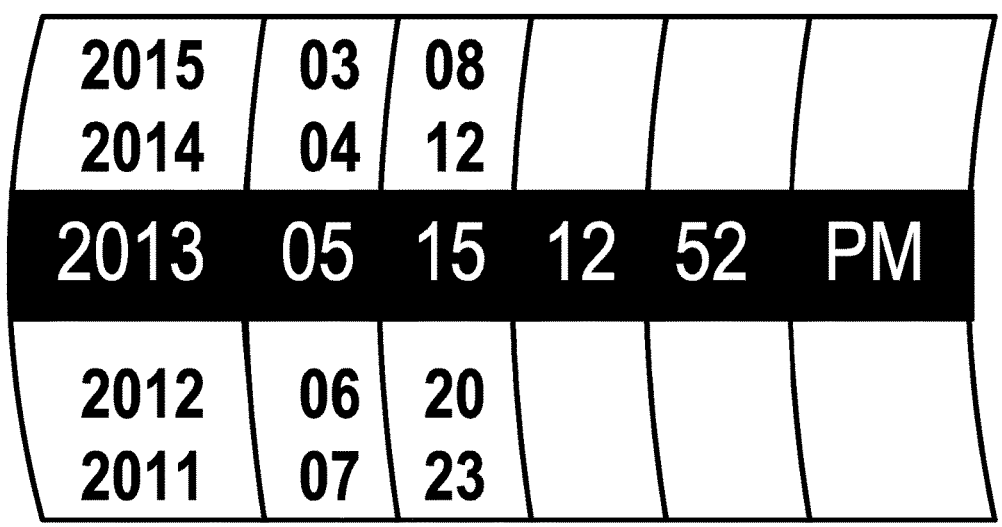
FIG. 10 shows that in some embodiments a time dial user interface enables dialing easily back through time, and skipping through months or years with one click.

A graphical user interface GUI (such as a "Continuum Navigator") makes this search capability even more powerful and intuitive. A time dial, as depicted in FIG. 10 and described below, can provide an intuitive interface to index Spaces at desired times from which to restore directories and/or files. Given a full filesystem image for each Space, the directories and files displayed can change rapidly (perceptively instantaneously) as the dial is turned.

Figure 9:
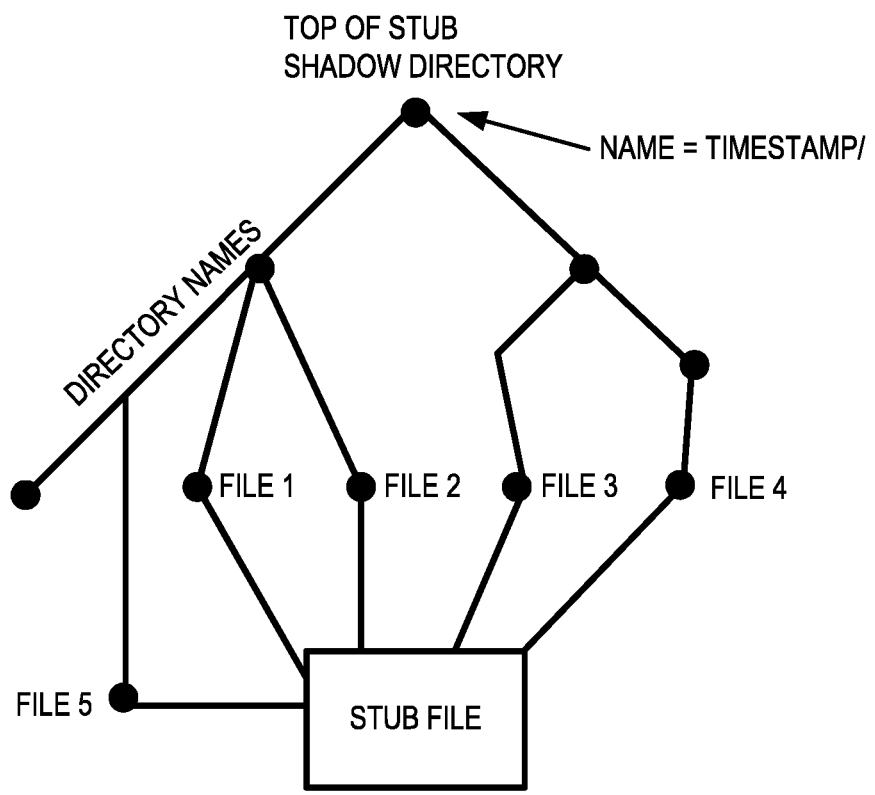
FIG. 9 shows an embodiment of the invention for implementing pointers to folders and files in the backup system using "stub files"

The Continuum filesystem maintains pointers to folders and files in the backup system. It also transparently maintains copies of selected folders and files online. This is sometimes called Hierarchical Store Management (HSM). This patent gives an embodiment for implementing such using "stub files" as depicted in FIG. 9. This allows multiple i-Nodes to point to one copy of the file that might physically be stored in the backup system until the sub file is replaced with an online file that is copied from the backup system.

Figure 2:
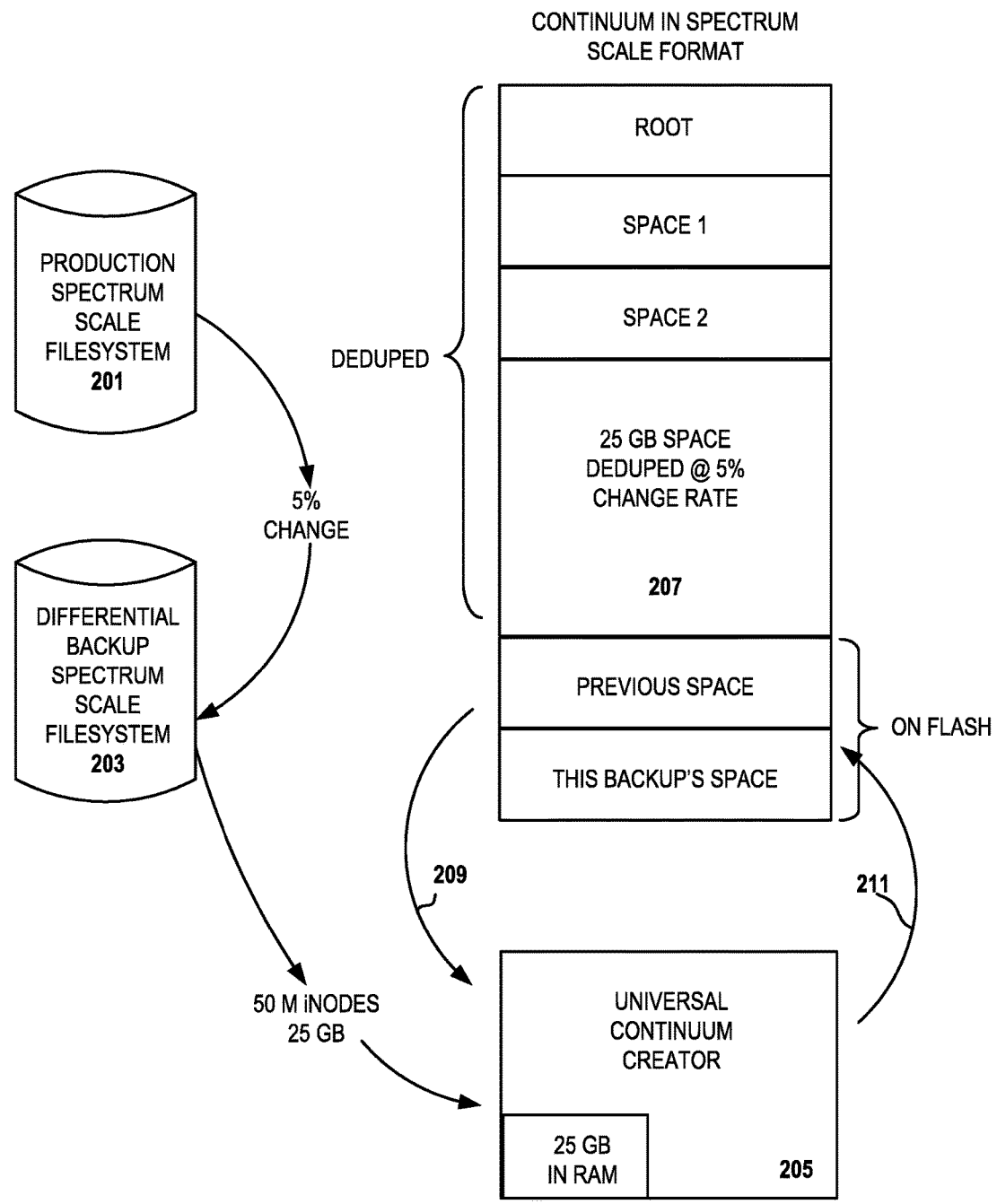
FIG. 2 shows a diagram for Continuum complete filesystem iNode additions according to some embodiments.

An embodiment of the Continuum filesystem would be to model the filesystem after existing filesystems with existing POSIX or augmented-POSIX interfaces. For example, one could use the same or similar metadata structures as depicted in FIG. 2.

Each Space could contain a large number of folder and file pointers (i-Nodes). Thus, Spaces for many Times could contain a very large number of i-Nodes. This disclosure describes methods of using compression and selectively deleting some Spaces through Time to minimize the storage requirements of the Continuum. This is also depicted in FIG. 2.

Figure 4:
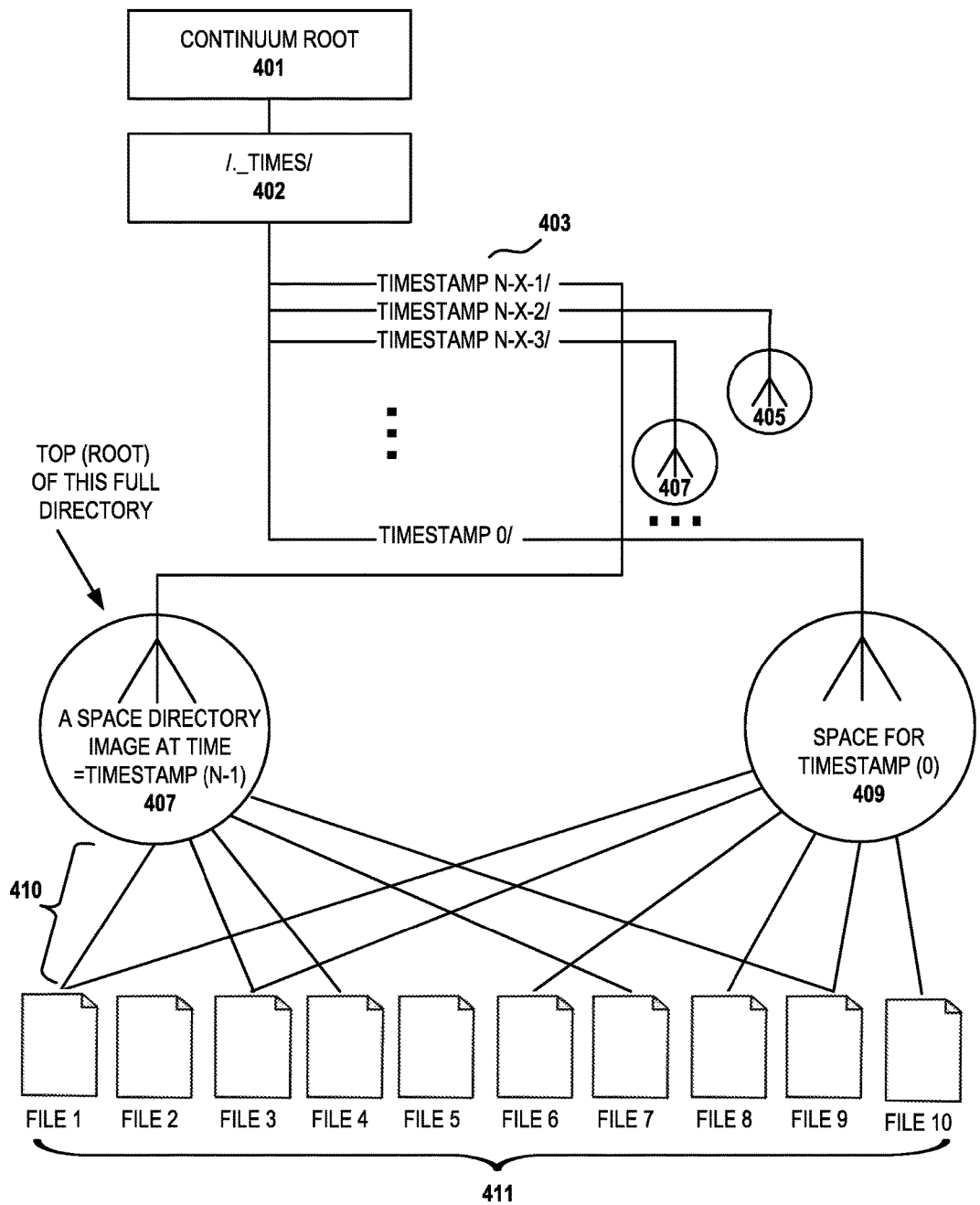
FIG. 4 shows a directory structure diagram for Continuum hidden spaces.
Figure 6:
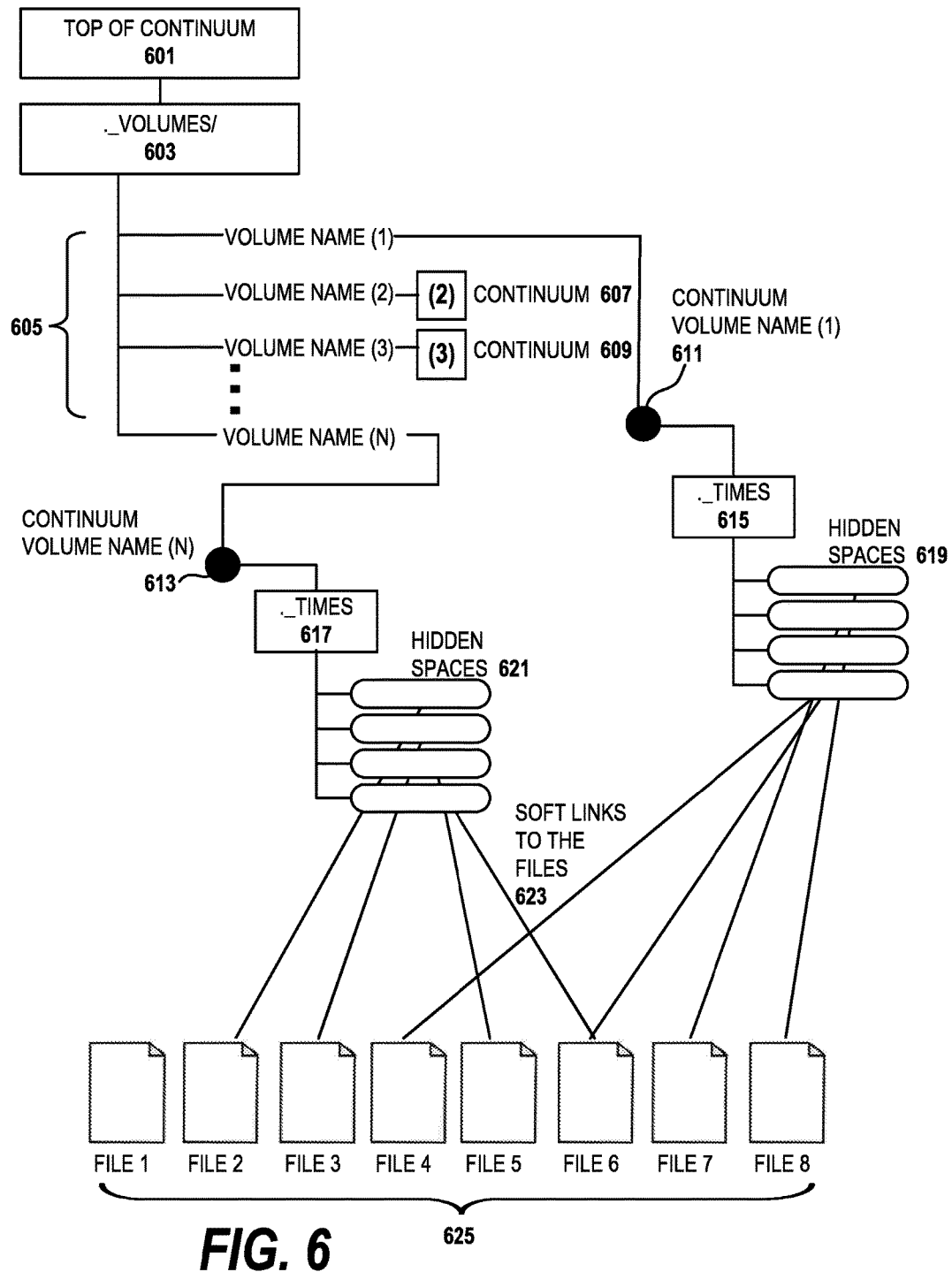
FIG. 6 shows a diagram for using soft partitions according to some embodiments of the invention.
Figure 7:
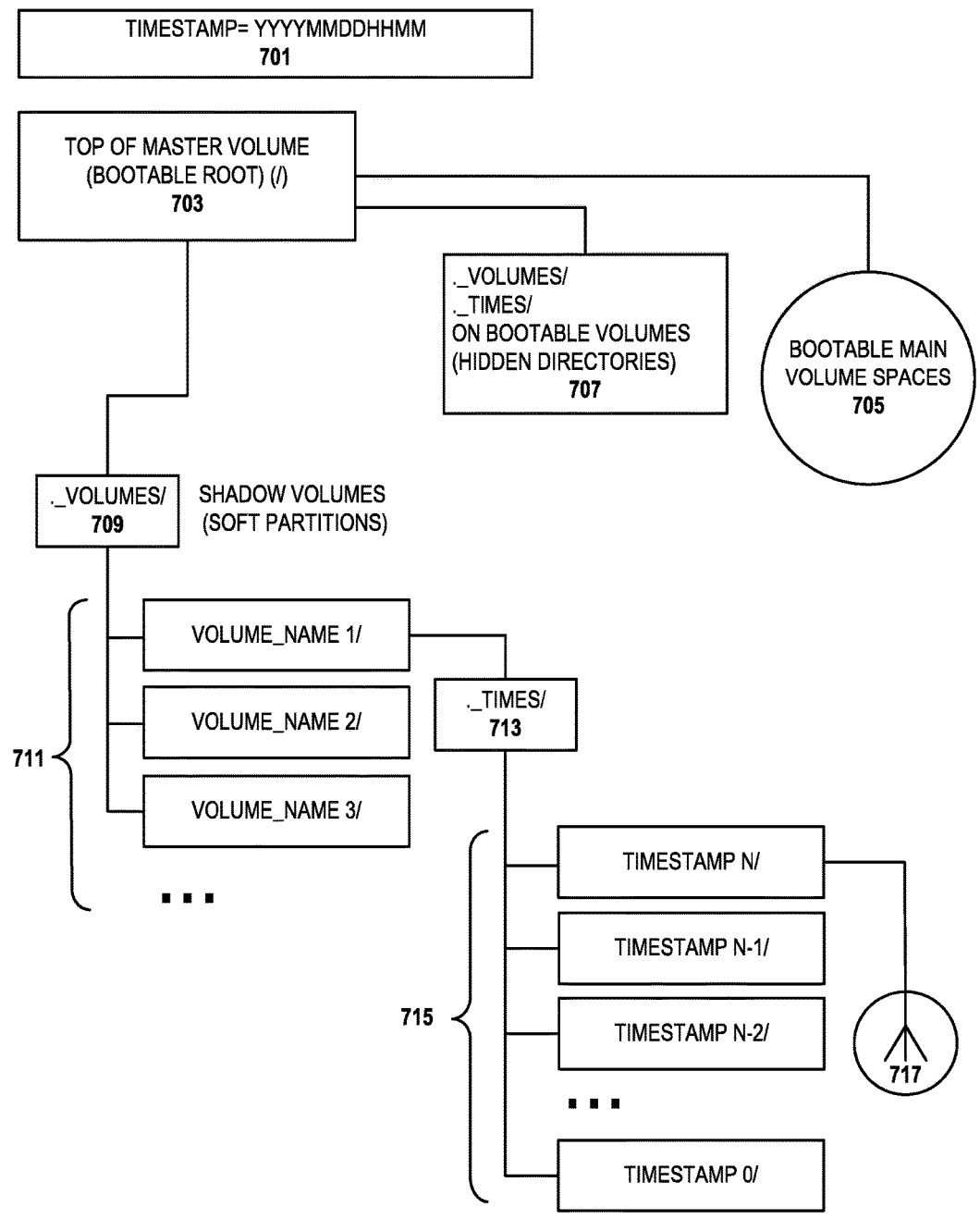
FIG. 7 shows, according to some embodiments, a detailed diagram of the directory structures used to form shadow directories.

Spaces at multiple times can be maintained using "shadow volumes" and "shadow directories" in hidden Spaces, as depicted in FIGS. 4 and 7. An industry-standard embodiment would to use the POSIX syntax of hiding directories with names that begin with a period, as depicted in FIG. 6.

Each Space can be associated with an easily indexable timestamp for the time when that Space was created, as depicted in FIG. 4.

In one preferred embodiment of the invention, the Continuum Navigator can be used in or in combination with a storage product such as IBM Spectrum Storage, IBM Spectrum Scale, IBM Spectrum Archive or IBM Spectrum Control. Remote-system indexing and retrieval is used, for example, by indexing and/or retrieving IBM Spectrum Control data from IBM Spectrum Scale.

Rapid and intuitive navigation through spaces (indexes such as filesystems) and time (data in previous-time spaces, such as in backups) are provided. Preferred embodiments of the invention create, maintain, and present complete past-time object-system images (mainly filesystem images) from periodic backups of present-time object images. The indexing of past-time spaces (mostly competed images of filesystems as of the time of a backup) such that one can rapidly navigate the spaces (mostly searching filesystems) and rapidly index back in time are provided by preferred embodiments of the invention. In embodiments, scalability is achieved by rapid indexing (mainly iNode creation), navigation, and data retrieval, using up to trillions or more object pointers (e.g., iNodes). Another aspect of the scalability is rapidly adding billions or more object pointers per backup.

A Nomenclature summary follows: Continuums are specialized databases for indexing and/or storing data and are context specific. Various forms of Continuums defined below and are used in Local and Universal Continuum Creator programs. Universal Continuum Databases (UCDBs) are Universal Continuum Creator databases, shadow directories, Continuums, and Spaces which are used for more nearly universal access and indexing. Additional components and their functions are defined below: Continuum Navigator, Time Dial, Universal Continuum Creator, Continuum Recreator, and Continuum Daemon.

Major sections of this specification explain the components of preferred embodiments of the invention and their operating states.

The Continuum Filesystem (CNTFS) section describes a key component for Continuum's navigation speed at searching through Space (with the Continuum Navigator GUI or with standard Linux commands). The CNTFS also has the ability to rapidly create billions of new iNodes for each new backup. Users can use the files referenced by the CNTFS without having to restore them as the files are in read-only directories, essentially frozen in time and Continuum's ability to store and access trillions of iNodes. Additional embodiments of the invention which use Shadow Directories, Soft Partitions and Stub Shadow Directories sections as enabling technology are described below.

The Continuum Filesystem Sever (CTNFS):

In preferred embodiments of the invention, the Continuum Filesystem Sever (CTNFS) is a standard Linux or Spectrum Scale, filesystem, with a few additions and modifications. Its directory is a file. That file is formatted as if it were a Linux or Spectrum Scale directory, so the code to read and write the filesystem is the same, also with an exception. Since it is a file, CNTFS can write Spaces contiguously (complete images of the present-time Space (the production filesystem)), append then to the end of the directory, and then link them to a section of the directory at the root. Since the Space directory will never change once written, the CNTFS can organize its structure for optimum indexing speeds and that speed will not degrade with use.

In one preferred embodiment, the root would be "_times/timestamp/" and the timestamp format is YYYYMMDDH-HDD (no seconds). The root would be linked to the root of the recently appended Space. Thus, each Space points to respective backups at a particular timestamp.

In preferred embodiments, backups are "immutable"—frozen in time. Thus, the Space directories are write-once, read-seldom (and rapidly) structures. As noted elsewhere, a 1 billion iNode Space would use 512 GB per Space per backup (before deduping), since a Space is a complete filesystem image for time=timestamp. Assuming a 5% change rate, that would generate 50 M incremental/differential backup iNodes at a size of 25 GB.

CNTFS can quickly create 1 billion iNode spaces. CNTFS reads the incremental and differential iNodes into memory. If there are too many to fit into memory, CNTFS makes several passes thought the Space it is creating. CTNFS reads the previous backup Space (512 GB). As it reads and writes it sequentially, it inserts and deletes iNodes according to the incremental/differential backup file. Since the iNodes are in memory that is a fast process. Thus, CNTFS can create a new 1 billion iNode Space in the time needed to write 512 GB (with overlapped reads). This ability to rapidly create large Spaces is a key feature in a Continuum's scalability. The ability to store many Spaces is also a key scalability feature.

In preferred embodiments of the invention, the OS mounts CNTFS as it would any filesystem. This presents users with a standard filesystem API. The users can change times by using a Time Dial interface in Finder interface described elsewhere or CD commands in Linux. For the latter the user would search /._times/timestamp for Spaces at a time they want to navigate and CD to that Space. The users could navigate using standard Mac and PC, and Linux commands and APIs, since it is a standard filesystem. Changing "times" would be as fast as changing directories (perceptively instantaneous), since it would literally be changing directories.

As mentioned elsewhere, iNodes in each space have symlinks to the files in preferred embodiments of the invention. Many files will be linked from many Spaces. As noted elsewhere, an efficient method to cull Spaces and locate files that have no links so they could be deleted. In other embodiments of the invention, iNodes can be linked to directories and files not in CNTFS.

In preferred embodiments of the invention, a Continuum provides another layer to address objects. Object IDs are kept in ObjectID files in arbitrary directories. From there various object managers can use the ObjectID files.

In embodiments, a Continuum provides two access methods to search through Space and time. The Continuum Navigator graphical user interface (GUI) presents a present-time Finder window, a past-time Finder window and a Time Dial. The GUI has the ability to drag and drop from the past-time window to the present-time window. It includes a Search facility to rapidly search through time for directory names, filenames, and file content using standard search options and Booleans. A user could select a line of a found file and open it in the past-time Finder window. Once located, these files can be opened with a double-click without having to restore them to the present-time Space. As mentioned elsewhere, each Space is a read-only directory. On operating systems that support this feature, once one found the target directory, one could open that directory and use a native-OS Finder window. Alternatively, a user could change the present-time Finder window to point to that directory in present-time.

The other access method to search is the set of standard Linux commands and APIs. For example, in Linux, to find a Space at a time, the user would change directories using the change directory command, i.e. "Cd/_times/". Then the user would list the timestamps stored in the times directory with the Ls command. Then the user would enter Cd to timestamp/ which was desired, i.e. the one is then at the root of that time's Space. It would be easy to create scripts that for a given directory would change times for from that directory to that directory at a different time.

Continuum Navigator scales as its address data is created at most times (since an original backup) with time-based complete-filesystem images as they were at the time of their backup. It delivers real-time and scalable data recovery. Continuum Navigator scales the numbers of files by using a filesystem image per time of each backup. In a preferred embodiments of the invention, it uses a full filesystem image, an iNode for every directory and file in that filesystem as that time of backup, for all backup times since the initial backup. Using online or offline indexable directories and files, for example, differential backups stored offline, Continuum Navigator scales in storage capacity.

Continuum Navigator scales real time, fast searches using direct access to directories that map to all incremental and other backups. Continuum Navigator also scales core time with high speed, low overhead-per-transaction searches to create and maintain the Continuum "four-dimensional" space that points to all directories files at all times.

The inventor uses the imagery of Continuum Navigator "sailing" through four dimensions of space-time to describe how it quickly locates and recovers lost or damaged computer files from "everywhere" and "everywhen". It searches the "everywhere" in three spatial dimensions: Directory nodes (their location and names), file soft and symlinks (their location and names), and files (the location of a byte (or other search criteria) in the content). Continuum Navigator searches "everywhen" in time, i.e. from now back to the beginning of backup time.

The high-speed, high capacity database of directories and files is called a Continuum. Continuums scale to hold trillions or more iNodes with fast access and maintenance performance (including iNode creation rates). A set of full filesystem images each for a given time are called "Spaces."

Preferred embodiments of the invention have several software components:

The Continuum Navigator is the search engine and rapidly searches through Space and time. The Dual-Continuum-Finder window is a user interface. One of the windows portrays files for the present time. The other window is for a selected past time. Using the interface, a user drags and drops files from the past to the present. Some embodiments of the invention use "wormholes", symlinks to a Continuum directory into a user's present-time Space. Another user interface object is called a Time Dial. The time dial is a GUI element showing years, months, days, hours, and minutes and preferably displays only times for which backups are indexed. Both dual continuum finder and time dial are used by the Continuum Navigator. The time dial is discussed in connection with FIG. 10.

On systems with limited physical storage to maintain sufficient operating capacity, a Continuum Creator culls old backups. In preferred embodiments of the invention, the Creator culls with smaller steps between time for earlier backups and larger steps between backups for later backups, never deleting the original backup.

The Continuum Daemon performs background functions. It also performs functions that require system privileges.

In some respects, Continuums are frozen in time, at least with respect to the already stored data. However, one can add new Spaces for new backup times. Existing Spaces within an existing Continuum are immutable according to preferred embodiments of the invention. These properties of a Continuum enable a user to change directories to the time and space of any directory and then run applications on those files (and others in any directory) without having to restore them. Given that changing time is as fast as changing directories, a user can navigate looking for files through time as fast one's eyes can see.

A user can use dual Continuum Navigator-Windows to search through time as fast as a user can dial the Time Dial to jump minutes, hours, days, months or years at a time. A user can also use standard CLI OS commands, scripts, and applications.

In preferred embodiments of the invention, Continuum meta-structures are public and read-only. One can change directories to the top of a Continuum. From there one can change directory down to the TIMES directory and list all the TIMESTAMPS in that directory. Then a user can change directory to a TIMESTAMP directory. The TIMESTAMP directory is the root of the Space at that time. Thus, in Linux embodiments, one can use Linux/Unix commands and applications on Spaces, since those Spaces are simply directories.

In preferred embodiments of the invention, Spaces are intelligently culled such that time between Spaces increases with age. The inventor calls this process "Time dilation". The beginning of time never changes; the oldest-time Space is always retained. However, the time between the oldest-time Space and its next-younger Space will be longer than the time between the most-recent Space and its next-oldest one, with time jumps between Spaces increasing going back in time. This method can be used to cap the capacity used in a Continuum.

Continuum Creator uses symlinks in preferred embodiments of the invention because files and directories can span volumes. Backups are immutable so symlinks are stable.

Major Concepts for Implementation:

Continuum meta information is stored in shadow directories that hold time-indexed filesystem images. Shadow directories also hold volume-indexed Parallel Universe volumes.

In preferred embodiments of the invention, the Continuum organization is as follow: Continuums are comprised of Space-time directories and Space-time backup repositories. The three "spatial" dimensions are directory nodes (their location and names); File symlinks (their location and names) and Files (their location and content). A first type of Space-time directory is a "Space", Spaces are spatially dimensional full-filesystem images. That is, a Space contains a filesystem image as it was at time=timestamp; for example from an incremental backup or a snapshot created by the operating system. Timestamps are used in preferred embodiments of the invention to index a time for each Space. For example, the format: YYYYMMDDHHMM can be used as an index. A second type of Space-time directory is a Time. Spaces and times are analogous dimensions; they do not differ physically. Spaces are directories, and have locations in a directory structure. Times are directories, and have locations of directories in time. As Spaces and Times are both directories, Continuum Navigator can sail through time as fast and sailing though filesystems (Spaces).

The navigation rate between Spaces is related to the latency to change directories. In many instances this will appear to be instantaneous.

Embodiments of the invention are used for incremental and continuous backups. An example of continuous backups is a hierarchical storage systems (HSM), such as IBM Spectrum Archive, that copies files to tape soon after they are created and maintains pointers to those copies in the main filesystem when they are removed to save online capacity. The HSM transparently retrieves the file from tape when it is opened or touched. The Universal Continuum Creator periodically creates a Space that contains the pointers in the online filesystem that point to online files and offline files. After a file is modified or deleted, copies on tape are usually no longer accessible. However, in this embodiment, they would be in a Continuum and thus could be retrieved by indexing times of these Spaces that were created periodically. An embodiment of creating a continuous-back Space is to copy the present-time filesystem image. Thus it need not be "inverted." The granularity of time between creating Spaces for continuous backups can be selectable. The Continuum will use more capacity with finer granularity of times between Spaces.

The Continuum Navigator is a GUI that acts as a "Finder" that navigates through space and time. One embodiment of the invention uses one Finder window for the present-time Space and a second Finder window for past-time Spaces. A Time Dial is used to move fluidly back and forth though time. The system can move through the Spaces in real time as quickly as the system can change directories and display folders/files in a folder. In a preferred embodiment of the invention, a user can drag and drop to restore folders/files. Double clicking on files in the past-time Finder window opens the older versions of files using their native application. Embodiments of the invention use a "Wormhole" GUI feature which connects a selected past-time to a present-time folder.

Universal Continuum Creator:

FIG. 2 illustrates a Universal Continuum Creator data flow using a Continuum-specific directory archive. In particular, FIG. 2 shows that, according to some embodiments, dataflow of modified iNodes from an incremental/differential backup, creating a new full image of the production filesystem, and then deduping it to shrink the size of each Space from 512 GB to 25 GB. In the drawing, the production file system 201, e.g., an IBM Spectrum Scale filesystem is being backed up 202 into the backup system 203, e.g., an IBM Spectrum Scale file system. The Universal Continuum creator 205 receives the changed iNodes 204 and begins the process of creating a new Space for this backup time. In preferred embodiments, the Universal Continuum Creator 205 will have a certain amount of RAM 206 dedicated to it, e.g., 25 GB which it will use preferentially to create the new Space. The Space is created in the storage space allocated to the Continuum 20X7 to which backups from the production system are assigned. The files in the Spaces of the Continuation 207 are preferably deduplicated to save on storage space for the Continuum 207.

If all the new iNodes fit in RAM, then only one pass is required to read the previous Space directory and write the present backup into the new Space. Otherwise, multiple passes are used. In the embodiment of the invention shown in the drawing, this backup and the previous day's backup fit in RAM.

The file format used to create the Continuum could take into account indices' I/O characteristics. In preferred embodiments of the invention, the aim is to write each Space once and read it seldom. As a practical matter, many 512-byte iNode records that can be appended sequentially, for example, there is 512 GB of data per billion iNodes. Often there is less than 512 GB per day (per incremental/differential backup). Thus, iNode creation and indexing rates are fast.

In preferred embodiments of the invention, it is greatly preferred that the Universal Continuum Creator be able to copy each Space as one object. This enables embodiments of the invention to invert a respective incremental backup into a complete Space. First, in one embodiment, the previous backup is replicated as the current backup, hence the sequential-append method. As one Space could easily hold a billion iNodes or more copying those one-by-one would be much less efficient that copying them as one object. Thus, the copy algorithm is to duplicate the previous backup and apply the incremental-backup information to the new (duplicate) Space.

The copy method, if feasible, should be optimized for rapidly creating and adding a new Space from a new incremental or differential backup. As some systems support billions of iNodes per filesystem, the copy method should be designed support that level of scalability. In one example embodiment, the copy method uses POSIX directory structures with three methods of storing and updating the structures. First, the structures are stored in an actual POSIX directory. In some respects, this is the most useful method as it enables using Linux CLIs and APIs directly as opposed only using the Continuum Navigator interface. However, the iNode injection rate might be a limiting factor. Second, the structures are stored in a file that exactly matches the structure and content of a POSIX directory, as if it were the operating system maintaining that content. Third, the structures are stored using a database engine. In this method, it is important that the database engine efficiently copies the previous Space into a new Space. If it were to copy iNodes individually, that could be inefficient. If it were to copy a Space as one object, that could be more efficient.

As mentioned above, the Universal Continuum Creator (UCC) could read the previous Space as an object and update from the incremental/differential backup information as the UCC passes the backup information sequentially to create a new Space. For example, with 1 B iNodes in the present-time Space and a 5% change rate, there would be 5 M iNode updates. At 512K per Node, this would be 25 GB of data. That amount of data should fit in the memory allocated to the Universal Continuum Creator and so should be efficient for updating the Space as it is read and written sequentially.

The Universal Continuum Creator data flow using POSIX (or other) directories is preferable so standard Linux APIs can traverse past-time read-only Spaces as fast as traversing present-time spaces. In a preferred embodiment of the invention, the method will store all of the Spaces for all of time (space permitting) in a database. It would provide POSIX-compliant directories for full Spaces at all times.

If the UCC maintains the Continuum in a POSIX (or other) directory as the method of directory creation, it does not use operating system commands to populate these directories. The UCC treats the filesystem directory as a file. The write speed is file write IOPs speed so that the UCC can write many iNodes per IOP. There are no multi-writer conflicts as the Universal Continuum Creator is the only writer. In preferred embodiments of the invention, Continuums are read-only for users.

For the "present-time" Space directory (the most recent) and file read speed the standard operations system speeds are the speeds for a full pass over the present-time Space. There is negligible added time if differential backups make a full pass over the present-time space and if the backups write into a Continuum as they do. A new most-recent Space backup reads from the current most-recent Space and applies the most recent differential backup. When writing to create the new Space the process should be augmented with periodic full present-spaces passes to check for errors that may be propagating.

As efficiency is essential, when writing and entirely a new full-filesystem directory from scratch for every backup, it could become a significant bottleneck. So the method described below is used in embodiments of the invention to significantly speed up the Space creation process.

The data path from the system's differential backup is changed into an incremental-backup file. The Universal Continuum Creator reads that file. The UCC also reads the previous day's Space (its full filesystem image). The UCC combines the incremental backup file for the present day and previous day's Space into a present-time Space. The Universal Continuum Creator writes the new full filesystem space into a POSIX or other directory. This process can be sped up considerably as the Continuum maintains its own directory that holds all Spaces for all times. Once Spaces are written into this directory, in preferred embodiments of the invention, the Spaces are immutable because the backups are immutable. That is, these Spaces are write-once structures.

The Universal Continuum Creator is the only program writing into this directory. Thus, it need not worry about write contention from other processes. The UCC could treat a directory as a special file and format it itself using application-level I/O in place of the filesystem API. The file structure could be optimized for read access. Once written, the directories and files in Spaces will never change. Thus, the UCC could write sequential Spaces into the directory, appending one for each new backup. Each new Space uses only one link to the ._times/ directory so creating that link after writing a sequentially. Linking the file after writing the file will ensure no read conflicts and that it is written.

Using this method means that the iNode write speed would be considerably faster than using the filesystem API. At 512 K per iNode, a 1 B iNode Space would be 256 GB in size so these would be fast writes and large-block sequential. The UCC could read the previous day's Space, read the incremental backup iNode changes into memory, and update the directory in one sequential read and write pass. In preferred embodiments of the invention, the directory structure of each Space could be optimized for read access. One would expect results for writing 1 B iNodes in the time it takes write 512 GB of large-block, sequential I/O. While the reads and writes would overlap, this should be sufficiently fast such that the overhead of creating a 1 B iNode Space should be reasonable.

Figure 3:
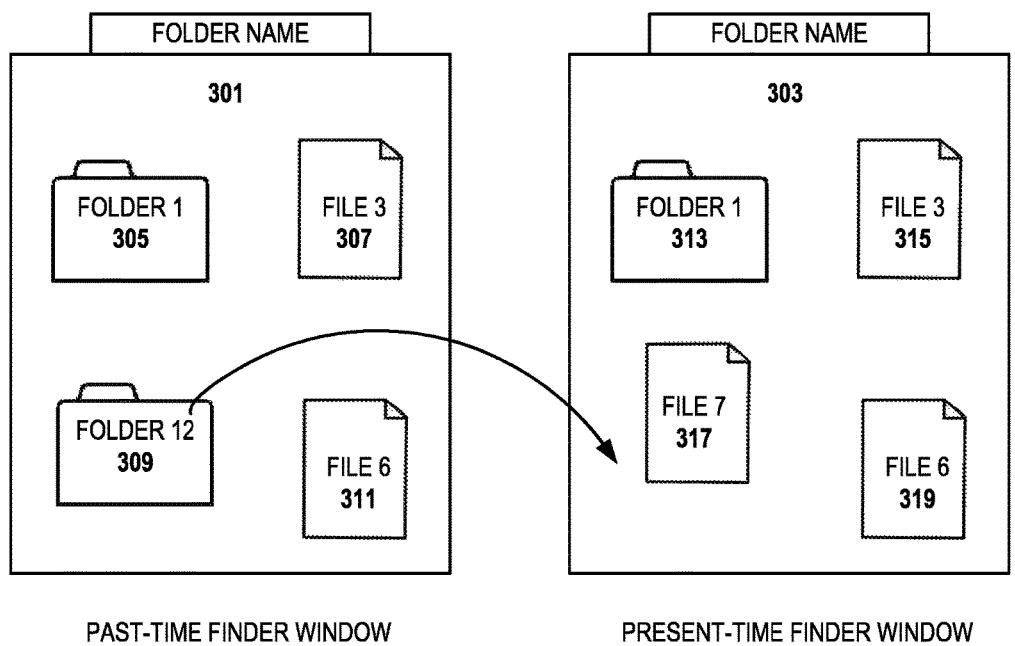
FIG. 3 shows that some embodiments enable navigating quickly and easily through space and time and drag and drop to retrieve files through the use of a user interface.

Two Dual-Finder Window Implementations:

FIG. 3 illustrates dual-Finder windows used in embodiments of the invention. The past-time window 301 is shown containing icons representing Folder 1 305, File 3 307, Folder 12 309 and File 311. The present-time finder window 303 is shown containing icons representing Folder 1 313, File 3 315, File 7 317 and File 6 311. The present-time finder window 303 is a Continuum-Finder window for the current time. One use for the interface is where a user locates the desired place/time from which to restore. In one embodiment, the user selects a folder in the present time window 303 and clicks on a "Start Here" button. The Continuum Navigator opens the past-time finder window 301 at that location, i.e. for that Space. In preferred embodiments of the invention, the past-time window 301 is responsive to user adjustments to the Time Dial 321 to adjust which Space (browse through locations and time) is represented in the past-time window. The Time dial 321 is described in greater detail below in connection with FIG. 10

A user can drag and drop a file from a Continuum-Finder window to a Continuum-Finder window or to an OS-Finder window to recover files. FIG. 3 depicts the user dragging and dropping Folder 12 309 into the present-time finder window in a copy operation. A user can double click on files in the Continuum-Finder window to open them in their associated application without having to restore them. This feature is useful for rapid document viewing.

In preferred embodiments of the invention, a user cannot add, modify or delete files shown in the past-time Continuum-Finder window 301 as the past Continuums are read-only directories.

Shadow Directories:

Shadow directories are directory structures used on Continuum backup partitions and volumes for efficiency, speed, scalability, versatility, simplicity, and reliability. In embodiments, the shadow directories can be used for multiple purposes. The specification describes three such uses. The characteristics of shadow directors match those of standard filesystem directories as they are standard directories. Thus, all filesystem operations such as removing or copying files (e.g., the Linux cp command), listing directories (the Linux ls command), searching for files or directories (The Linux find command), changing-to directories (the Linux cd command), searching file contents (the grep command), creating files/directories, and deleting file/directories, all run at standard sub-second filesystem speeds.

Referring to FIGS. 1 and 4, the top directory is either the root of a physical partition (/) or an arbitrary directory (traditionally, foobar/). FIG. 1 shows that, in some embodiments, the most recently created Space is not hidden, and thus, is bootable. In particular, FIG. 4 shows, according to some embodiments, multiple Spaces (from different times) with soft links to the same set of files. In FIG. 1, the bootable root 101 and, in FIG. 4, the Continuum root 401 are top root directories while shadow directory 107 in FIG. 1 and shadow directories 405, 406, 407 and 409 serve as Spaces for the times (105, 403) when the respective Spaces are created. The shadow directories are useful for creating soft volumes (shadow volumes) in an arbitrary directory on a remote server. In the case of the shadow directories, the top directory is labeled "top" instead of "root".

As shown in FIG. 4, shadow directories going back in time are grouped in one standard directory called "._times/" 402. Shadow directory names are timestamps in the form of: ._times/yyyymmddhhmm, where yyyy=year, mm=month, dd=day, hh=hour, mm=minute and no seconds. The top directory has a timestamp, _top_yyyymmddhhmm.

Indexing shadow directories is fast and simple. Given the name of each shadow directory is its timestamp locating a selected time is fast and easy. Shadow directories are "hidden" directories.

Shadow directories use symlinks 109, 410 to point to files. Individual files will tend to have existed for a long time; they would be in many shadow directories. They would have many links 109, 410 from many shadow directories pointing to them at once.

Soft Partitions (Shadow Volumes):

As depicted in FIG. 6 (Parallel Universes) and FIG. 7 (Shadow Directory Structure), soft partitions or shadow volumes are used in preferred embodiments of the invention. Shadow volumes are analogous to shadow directories, but virtualize volumes instead of virtualizing time. Shadow volumes are hidden directories. In preferred embodiments of the invention, shadow volumes are grouped in a directory called "._volumes/".

FIG. 6 shows a diagram for soft partitions according to some embodiments of the invention. In particular FIG. 6 shows, according to some embodiments, multiple Volumes (soft partitions) with soft links to the same set of files. The soft partitions implementation for the "parallel universes" (multiple logical volumes in a single logical volume) embodiment of the invention is depicted in FIG. 6. The root directory and top of the continuum 601 links to the volumes/ directory 603 which serves the function of hiding the individual shadow volumes 607, 609, 611, 613. There is one shadow volume directory for each soft partition (logical volume).

As shown, volumes directory 603 has a catalog of shadow volume names 605. The shadow volume names 605 may take the form of _volumes/volume_name. Each shadow volume refers to a particular Continuum. In preferred embodiments of the invention, there are hidden "time" directories 615, 617 in each Shadow_volume 611, 613. The time directories contain a catalog of Space names in the particular Continuum. The Space name may have the format of ._volumes/volume_name/._times/yyyymmddhhmm which represents a timestamp for the particular Space. Using this naming format, the timestamp for Shadow_volume root directory is _volumes/volume_name/._top_yyyymmddhhmm.

The Continuum Navigator directory-structure has a top directory 611 which includes all the files and directories from the latest backup. They are in the "top" directory. The "top" directory is a bootable "root" directory of it is at the top of a physical partition 701. The top directory also includes a hidden._times/ directory 615. The ._times/ directory included on shadow directory for each incremental backup. The Space name for a given Space may take the form of .times/_.timestamp/. These Spaces 619 are time stamped by using their timestamp as their directory name. Below each shadow directory 619 is the complete image of the backed-up filesystem as it was at the time of that backup. These directories 619 use symlinks 623 or other soft links to the files 625.

Optionally, as shown in FIG. 7, the top directory 703 includes a ._volumes/ directory 709 that houses volume names 711 each having a respective name of the format of: ._volumes/._volumenames/ which point to a respective volume which are soft partitions 711. Each volume directory/soft partition is the top directory for that volume. Each soft partition uses Continuum Navigator's shadow-directory structure to create one shadow directory (a Space) per incremental backup as described above. The Space shadow directories are indexed in the times/ directory 713 by their respective timestamps names 715. A respective timestamp name points to the corresponding Space, e.g., Space 717. The timestamp may take the form of Timestamp=YYYMMDDHHMM as shown in box 701. The top shadow-volume directory (._volumes/) can reside in any arbitrary directory. Thus, any directory on a remote server or a local server can be a repository for Continuum Navigator backups. In preferred embodiments of the invention, on bootable volumes 707 the ._volumes/ and ._times/ directories are hidden while on non-bootable volumes 707 the ._volumes/ and ._times/ directories are visible. Block 705 represents the bootable main volume Spaces.

Figure 8:
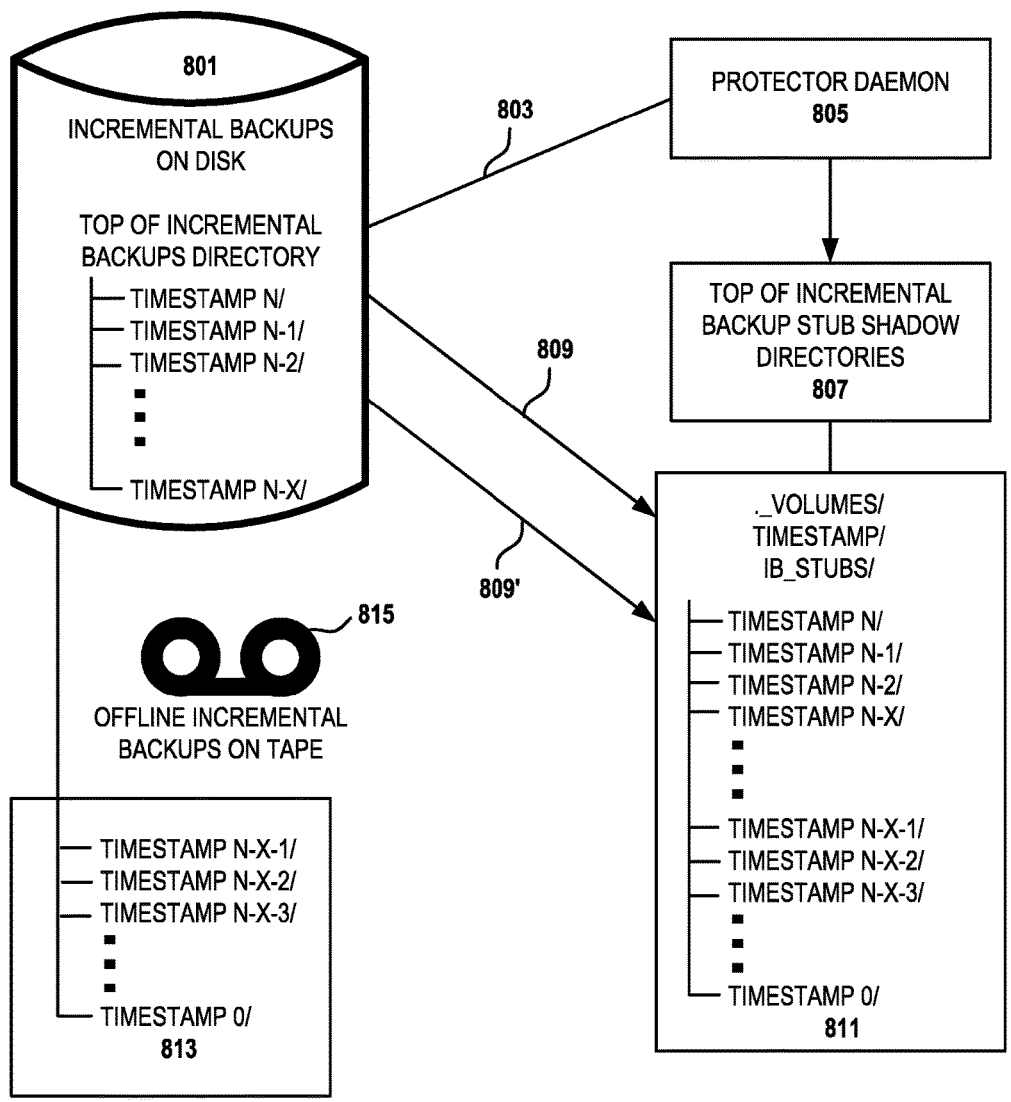
FIG. 8 shows that in some embodiments, the continuum organizes directory and file information for offline backups pointing to a dummy stub file instead of a soft link.

Stub Shadow Directories:

As shown in FIG. 8, aspects of the Universal Continuum Creator and Stub Shadow Directories are illustrated. This layer of directories is included in preferred embodiments of the invention because Continuum Navigator is designed to be as universally portable and applicable as possible. This is for cases where incremental backups are stored briefly on disk 801 and then moved to tape 815.

And when the incremental backups are on tape, their directory structure and filenames are not readable. So Continuum Navigator would need to capture that information before they are moved to tape to allow users to navigate through time and directories to restore their data, for example, if the user drags and drops a folder or file from an older Space to recover their data as described above.

As shown, the Continuum Daemon 805 would signal 803 to the storage server 803 to reload the necessary incremental backups. As the process is system specific, the specification does not explain how this process might be accomplished. The requirement is that the storage server 801 reloads the incremental backup such that the Continuum Daemon 805 can read their directory structure and copy appropriate files. The Daemon 805 can also be used to create pointers to files as they are migrated. When those files are deleted from the present-time Space past-time Spaces will still point to those files.

The structures in which the Daemon 805 would store this information are called "Stub Shadow Directories." 807. Other shadow directories 811 contain a directory structure for an entire filesystem for each backup time. In preferred embodiments of the invention, the stub directories 811 mirror only the directories 813 in each incremental backup from the storage server 801. The shadow directories 811 are not processed into whole-filesystem Shadow Directories as they do not point to any real files. The file iNodes are hard lined to a dummy file called "Stub" depicted in FIG. 10.

While the incremental backups are on disk 801, the Continuum Daemon 805 traverses them. The Daemon 805 copies their directory and file structure into an Incremental Backups Stub Shadow Directory 807. This allows Universal Continuum Creator, in real time, to construct Shadow Directories for a selected scope (top of the scope) and let the user navigate through those structures. For example, when the user drag and drops to recover files the system reloads the needed incremental backups, e.g., from tape 815. Universal Continuum Creator can then map the Stub Shadow Directory names against the directories in the restored incremental backup(s). From there, the UCC can generate the limited-scope shadow directories. In shadow directories particular to directories to files on particular media, Stub directories store the metadata necessary to access such off-line media and to match the backup directories and files with those indexed by the Stub directories. For example, the UCC may use a in ._media_identifier/ tag.

The hierarchy of one shadow directory is shown in FIG. 8 where the top node is the timestamp name which represents a particular Space, and directory name nodes are along one edge of the hierarchy. Respective files are members of the directories and represented by file nodes which are hard lined into the stub file at the bottom of the hierarchy.

Hidden and Visible Spaces:

Hiding Spaces on resilient servers makes it harder to use instantaneous recovery. It is harder to locate the ._times directory.

According to POSIX filesystem protocols, shadow directories with names begin with a period are hidden. They would not show in standard Linux searches (such as when using "ls"). An embodiment for visible Spaces begins the shadow directory names with an underscore.

For example, one could use a "._times/" directory or a "_times/" directory.

Figure 5:
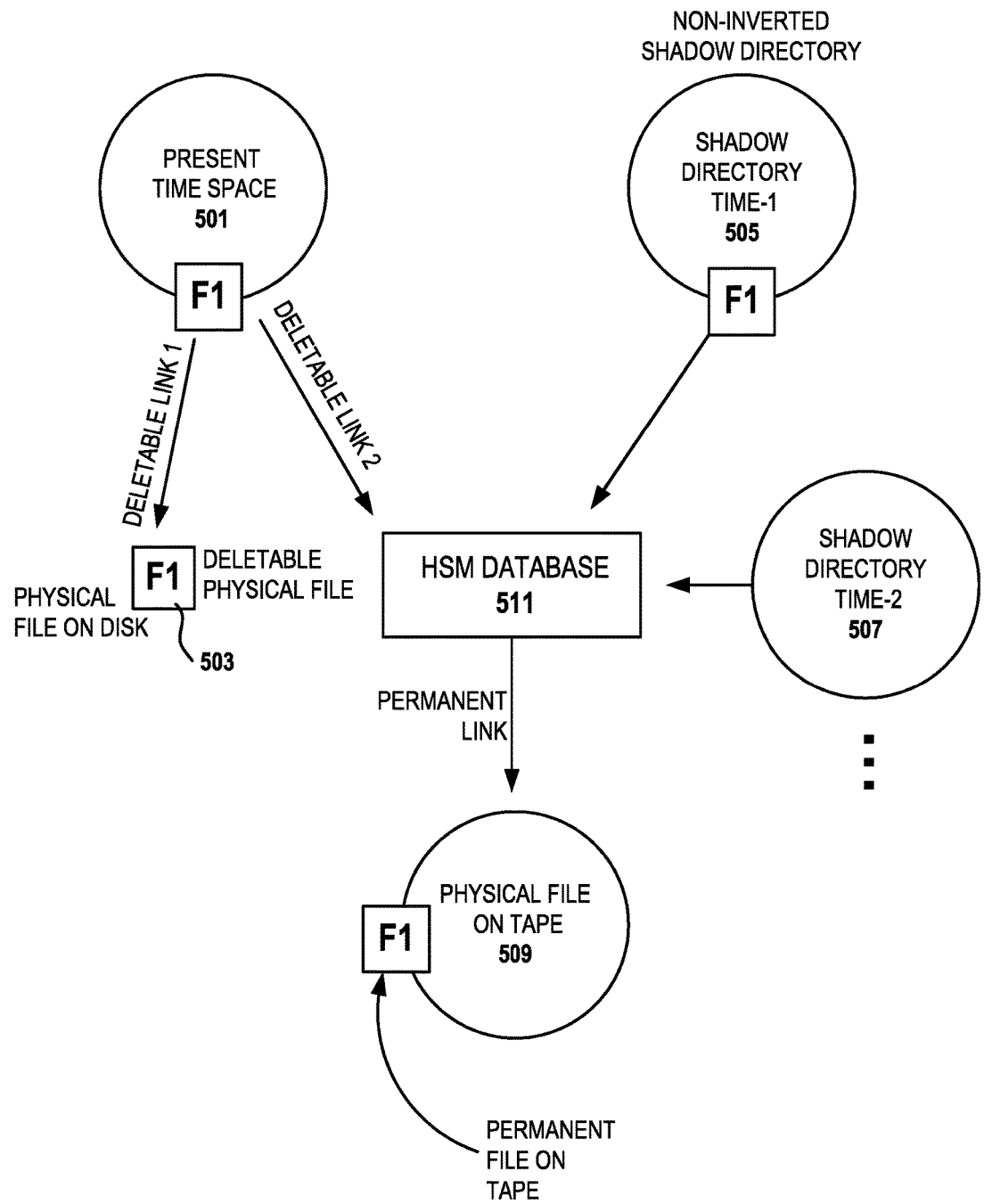
FIG. 5 shows that some embodiments of the invention create symlinks to files recently added to the HSM.

Continuous-Backup Shadow-Directory Creation:

As illustrated in FIG. 5, in preferred embodiments of the invention, continuous incremental backups on Hierarchal Storage Systems (HSSs) are performed using Hierarchal Storage Managers (HSMs) such as IBM Spectrum Archive perform continuous backups. New and modified files are copied to tape shortly after they are created, assuming they persist long enough for this continuous incremental backup process to find them. At that point, the files reside both on disk and on tape.

The tape copy is a persistent-redundant copy. Its iNode points into the HSM database. The HSM database then points to its location on tape. When the file is modified or deleted, its iNode is removed from the present-time Space. However, the HSM's pointer to its location on tape persists.

Thus, the Universal Continuum Creator needs to maintain pointers from past-time Spaces to the HSM pointers for these deleted and modified files.

As shown in FIG. 5, the present time Space 501 has a deletable link 502 to the physical copy of file F1 on disk 503. The deletable link 504 is sent to the HSM database 511 which maintains the permanent link 506 to the physical copy of file F1 on tape 509. As shown, shadow directory at time-1 505, a past time Space, has references to file F1 which currently use a deletable link 508 to access the physical file on disk 503. In the event that the copy on disk 503 is deleted or modified, the UCC needs a way to be able to reference the permanent link 506 maintained by the HSM 511. As shown, older shadow directories 507 do not reference file F1, so this is a problem only for the shadow directory time-1 as to this particular file.

The UCC methods for maintaining pointer from past-time Space to HSM stored files might be HSM-specific according to vendor. One exemplary method would be to create a shadow-directory in which links to files that are copied to tape as that happens. In some embodiments, the HSM may need to trigger these events. Alternately, they might maintain transaction and other logs that Universal Continuum Creator can periodically scan.

The Universal Continuum Creator could use those pointers to create either limited-scope or full-Space shadow directories for Continuum Navigator's use. Periodically, the continuous backups can be gathered into a logical incremental backup, indicating all changes between the time interval of that incremental backup and its previous one. With that, Universal Continuum Creator could invert that incremental backup, as needed. The UCC can invert backups either on the fly for limited-scope Spaces or when that incremental backup is generated to create a full-Space for that time.

Universal Continuum Creator has two methods of scaling on large-resilient fileservers. Inverting the backups, for each incremental backup, the UCC makes a pass over an entire present-time Space to create a new past-time Space, comparing with the incremental backup as the UCC proceeds. The time-overhead is tolerable, given this can run in parallel with other tasks.

"Search Through Time"

Users navigate a past-time Continuum-Finder window to a desired starting directory and click on a "Start here" button. The past-time window displays a mirror of that directory with a Time Dial to dial back through time. When the user reaches the desired place and time, the user may drag and drops files/folders from the past window to the present-time window to recover files.

Without specifying specific times using the Time Dial, the Continuum Navigator searches back in time to find folder names, file names, contents in files. In preferred embodiments of the invention, it includes many search parameters with Boolean logic, e.g., File/folder names, dates and file content. Settable search scope using the entire volume or a particular folder are used in embodiments. The interface lists all files/folders at all times that match the search criteria and in one embodiment allows the user to double click on one of them to view them in their directory in a Finder window.

Portability

Preferred embodiments of the Continuum Creator requires operating system and filesystem support of symlinks or similar links to files. Symlinks are useful in this case because Continuum directories and other directories and files can reside on different volumes.

Embodiments of the invention are designed to be compatible with resilient and smart remote-storage servers, for example but not limited to IBM Spectrum Control, IBM Spectrum Archive, and IBM Spectrum Scale. Usually, no operating system modifications are necessary. Embodiments are scalable from small workstations to large IBM Spectrum Scale storage.

Continuum Time Dial

As shown in FIG. 10, the "Time Dial" user interface control allows a user to quickly and intuitively navigate back through time. In preferred embodiments of the invention, it shows only those times with backups, e.g., in shadow directories. Each displayed time is a time for each shadow directory; it does not display times not in the shadow directories. In preferred embodiments, shadow directories are named by their timestamp and so it is easy and fast to determine the times to show and not to show in the Time Dial. As shown in FIG. 3, the Time Dial is displayed above the past-time Continuum-Finder window in some embodiments. The user can dial back to the desired time to selected files and/or folders. When the user changes to a new time in the time dial Continuum Navigator changes to the directory with that timestamp.

The dial displays years, months, days, hours, and minutes, no seconds, and AM/PM. In the code, timestamps use a 24-hour clock (0:01 to 24:00 hours). This is displayed in either AM/PM format or 24-hour format. This is a configurable option with AM/PM as the default. The "year" dial starts in the first year of backups. When selecting a year, the Time Dial displays earliest month when backups are present; when selecting a month, the Time Dial displays earliest day when backups are present. When selecting a day, it displays earliest hour when backups are present. When selecting an hour, it displays earliest minute when are backups are present. Times for which there are no corresponding backups are not shown or are shown in gray. The default time is the current time. As shown in FIG. 10, the Time Dial displays some time units before and some time units after the currently selected time.

FIG. 10 shows the "Time Dial" used in preferred embodiments of the invention. Independent columns are used for years/months/days/hours/minutes. This example shows an exemplary case with a few backups before and after the target date for purposes of illustration. In most cases, the times between these backups would be more granular. The time selected is May 15, 2013 at 12:52 PM. Given the selection of 2013 as the year, the user can see that backups are available for at least March, April, May, June and July for that year. Given the selection of May (2013), the user can see that there are backups available for at least May 8, May 12, May 15, May 20 and May 23 (2013). In this illustrative case, there were no backups between these times, but those skilled in the art would recognize that in most actual uses of the invention, there would be much more frequent backups, possibly many per day.

By using, i.e. manipulating, the displays for Days, Hours, and Minutes the user interface makes it easy to find the desired time from which to restore files. To find a particular minute, the user dials back only minutes; to find a particular hour, the user dials back only hours. To find a particular day, the user dials back only days; to find a particular month, the user dials back only months and/or years. The user adjust the dials by clicking and dragging the bars, using a mouse, or using touch-pad gestures (two-finger scroll on Macs).

In preferred embodiments of the invention, where there are multiple backup volumes mounted, the Time Dial indicates on which backup volume it will dial back in time. The user can select among the mounted volumes. By pulling down to a list of mounted backup volumes and determine which top-directory to use.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation.

Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

The invention claimed is:

1. A method for time based protection of data stored in a source volume of a computer system, comprising:
  receiving a first backup from a storage system, the first backup containing an image of the source volume for a first time;
  associating a first time stamp representing the first time with the first backup;
  storing the first backup as a first directory indexed by the first time stamp in a top backup directory;
  receiving a second backup from the storage system, the second backup containing an image of the source volume for a second time;
  associating a second time stamp representing the second time with the second backup;
  storing the second backup as a second directory indexed by the second time stamp in the top backup directory;
  linking the first and second directories to a section of the top backup directory at a root of the top directory;
  reading a time stamp associated with the top backup directory that stores a previously stored backup of the data;
  creating a shadow top directory, wherein a name of the shadow top directory is associated with the time stamp;
  moving at least one subdirectory under the top backup directory to the shadow top directory;
  creating a time stamp corresponding to the current time for a new backup and associating the time stamp with the top backup directory; and
  for each source subdirectory under the source volume, performing a backup of the source subdirectory into a corresponding backup item under the top backup directory;
  wherein each backup is an incremental backup.

2. The method as recited in claim 1, further comprising performing a backup of a source item, wherein performing a backup of a source item comprises:
  if the source item does not have a corresponding backup item under the shadow top directory, backing up the source item into a corresponding backup item in a corresponding location under the top backup directory;
  if the source item has a corresponding backup item under the shadow top directory, comparing the source item with the backup item under the shadow top directory;
  if the source item is identical to the backup item, creating a hard link in a corresponding location under the top backup directory, wherein the hard link points to the backup item under the shadow directory;
  if the source item is not identical to the backup item under the shadow top directory: if the source item is a source file, backing up the source file into a backup file in the corresponding location under the top backup directory;

if the source item is a source subdirectory:
creating a corresponding backup subdirectory in the corresponding location under the top backup directory; and
performing a backup of each sub item under the source subdirectory into a corresponding sub item under the corresponding backup subdirectory under the top backup directory.

3. The method of claim 1, wherein the shadow top directory and items under shadow top directory are hidden.

4. The method of claim 3, wherein the shadow top directory is not bootable.

5. The method of claim 1, wherein the top backup directory is bootable.

6. The method of claim 1, further comprising providing a restore interface, wherein the restore interface includes:
a present time window displaying data items at the present time, wherein the present time window enables a user to select a selected item under the source volume;
a time dial that enables a user to select a backup time that corresponds to a time stamp from a plurality of time stamps under which a backup of the selected item exist; and
a backup window, wherein the backup window displays the backup of the selected item at the selected backup time.

7. The method of claim 6, further comprising enabling a user to select a sub item in the backup window for being restored.

8. The method of claim 7, wherein enabling the user includes enabling the user to drag the sub item under the backup window and drop it into the present time window.

9. The method of claim 1, further comprising:
running a backup daemon, wherein the backup daemon performs periodic incremental backups.

10. A system for time based protection of data stored in a source volume of a computer system, comprising:
a processor;
computer memory holding computer program instructions executed by the processor for performing database maintenance, the computer program instructions comprising:
program code, operative to receive a first backup from a storage system, the first backup containing an image of the source volume for a first time;
program code, operative to associate a first time stamp representing the first time with the first backup;
program code, operative to store the first backup as a first directory indexed by the first time stamp in a top backup directory in a computer memory;
program code, operative to receive a second backup from the storage system, the second backup containing an image of the source volume for a second time;
program code, operative to associate a second time stamp representing the second time with the second backup;
program code, operative to store the second backup as a second directory indexed by the second time stamp in the top backup directory;
program code, operative to link the first and second directories to a section of the top backup directory at a root of the top directory;
program code, operative to read a time stamp associated with the top backup directory that stores a previously stored backup of the data;
program code, operative to create a shadow top directory, wherein a name of the shadow top directory is associated with the time stamp;
program code, operative to move at least one subdirectory under the top backup directory to the shadow top directory;
program code, operative to create a time stamp corresponding to the current time for a new backup and associating the time stamp with the top backup directory; and
program code, operative to perform a backup of the source subdirectory into a corresponding backup item under the top backup directory;
wherein each backup is an incremental backup.

11. The system as recited in claim 10, further comprising program code, operative to performing a backup of a source item, wherein the program code, operative to perform a backup of a source item comprises:
program code, operative to back up the source item into a corresponding backup item in a corresponding location under the top backup directory if the source item does not have a corresponding backup item under the shadow top directory;
program code, operative to compare the source item with the backup item under the shadow top directory if the source item has a corresponding backup item under the shadow top directory; and
program code, operative to creating a hard link in a corresponding location under the top backup directory if the source item is identical to the backup item, wherein the hard link points to the backup item under the shadow directory.

12. The system as recited in claim 11, wherein the program code, operative to perform a backup of a source item further comprises:
program code, operative to backing up a source file into a backup file in the corresponding location under the top backup directory if the source file is not identical to a backup file under the shadow top directory;
program code, operative to create a corresponding backup subdirectory in the corresponding location under the top backup directory if the source item is a source subdirectory and if the source item is not identical to the backup item under the shadow top directory; and
program code, operative to perform a backup of each sub item under the source subdirectory into a corresponding sub item under the corresponding backup subdirectory under the top backup directory.

13. The system of claim 12, wherein the shadow top directory is not bootable.

14. The system of claim 10, further comprising program code, operative to provide a restore interface, wherein the restore interface includes:
a present time window displaying data items at the present time, wherein the present time window enables a user to select a selected item under the source volume;
a time dial that enables a user to select a backup time that corresponds to a time stamp from a plurality of time stamps under which a backup of the selected item exist; and
a backup window, wherein the backup window displays the backup of the selected item at the selected backup time.

15. The system of claim 14, further comprising program code, operative to enable a user to select a sub item in the backup window for being restored.

16. The system of claim 15, wherein enabling the user includes enabling the user to drag the sub item under the backup window and drop it into the present time window.

17. A computer program product in a non-transitory computer readable medium for use in a data processing system, the computer program product holding computer program instructions executed by the data processing system for performing time based protection of data stored in a source volume of a computer system, the computer program instructions comprising:

program code, operative to receive a first backup from a storage system, the first backup containing an image of the source volume for a first time;

program code, operative to associate a first time stamp representing the first time with the first backup;

program code, operative to store the first backup as a first directory indexed by the first time stamp in a top backup directory in a computer memory;

program code, operative to receive a second backup from the storage system, the second backup containing an image of the source volume for a second time;

program code, operative to associate a second time stamp representing the second time with the second backup;

program code, operative to store the second backup as a second directory indexed by the second time stamp in the top backup directory; and program code, operative to link the first and second directories to a section of the top backup directory at a root of the top directory;

program code, operative to read a time stamp associated with the top backup directory that stores a previously stored backup of the data;

program code, operative to create a shadow top directory, wherein a name of the shadow top directory is associated with the time stamp;

program code, operative to move at least one subdirectory under the top backup directory to the shadow top directory;

program code, operative to create a time stamp corresponding to the current time for a new backup and associating the time stamp with the top backup directory; and program code, operative to perform a backup of the source subdirectory into a corresponding backup item under the top backup directory;

wherein each backup is an incremental backup.

18. The computer program product as recited in claim 17, further comprising program code, operative to performing a backup of a source item, wherein the program code, operative to perform a backup of a source item comprises:

program code, operative to back up the source item into a corresponding backup item in a corresponding location under the top backup directory if the source item does not have a corresponding backup item under the shadow top directory;

program code, operative to compare the source item with the backup item under the shadow top directory if the source item has a corresponding backup item under the shadow top directory; and program code, operative to creating a hard link in a corresponding location under the top backup directory if the source item is identical to the backup item, wherein the hard link points to the backup item under the shadow directory.

19. The computer program product as recited in claim 18, wherein the program code, operative to perform a backup of a source item further comprises:

program code, operative to backing up a source file into a backup file in the corresponding location under the top backup directory if the source file is not identical to a backup file under the shadow top directory;

program code, operative to create a corresponding backup subdirectory in the corresponding location under the top backup directory if the source item is a source subdirectory and if the source item is not identical to the backup item under the shadow top directory; and program code, operative to perform a backup of each sub item under the source subdirectory into a corresponding sub item under the corresponding backup subdirectory under the top backup directory.

20. The computer program product of claim 19, wherein the shadow top directory is not bootable.

\* \* \* \* \*